US012590739B2

(12) United States Patent
Wakuda

(10) Patent No.: US 12,590,739 B2
(45) Date of Patent: Mar. 31, 2026

(54) ROTATING MAGNETIC FIELD GENERATION DEVICE, MAGNETIC REFRIGERATION DEVICE, AND HYDROGEN LIQUEFACTION DEVICE

(71) Applicant: Hitachi, Ltd., Tokyo (JP)

(72) Inventor: Tsuyoshi Wakuda, Tokyo (JP)

(73) Assignee: Hitachi, Ltd., Tokyo (JP)

( * ) Notice: Subject to any disclaimer, the term of this patent is extended or adjusted under 35 U.S.C. 154(b) by 337 days.

(21) Appl. No.: 18/277,106

(22) PCT Filed: Dec. 28, 2021

(86) PCT No.: PCT/JP2021/048883
§ 371 (c)(1),
(2) Date: Aug. 14, 2023

(87) PCT Pub. No.: WO2022/190586
PCT Pub. Date: Sep. 15, 2022

(65) Prior Publication Data

US 2024/0125521 A1 Apr. 18, 2024

(30) Foreign Application Priority Data

Mar. 8, 2021 (JP) ................................ 2021-036388

(51) Int. Cl.
*F25B 21/00* (2006.01)
*H01F 6/04* (2006.01)

(52) U.S. Cl.
CPC ............... *F25B 21/00* (2013.01); *H01F 6/04* (2013.01); *F25B 2321/0022* (2013.01)

(58) Field of Classification Search
CPC .......... F25J 1/001; F25J 1/0225; F25J 1/0268; F25J 2210/42; F25J 2210/62;
(Continued)

(56) References Cited

U.S. PATENT DOCUMENTS 7,489,062 B2 * 2/2009 Shah ..................... H02K 1/246
310/156.08
8,099,964 B2 * 1/2012 Saito ..................... F25B 21/00
62/3.1
(Continued)

FOREIGN PATENT DOCUMENTS

JP S56-10266 A 7/1979
JP H06-151983 A 5/1994
(Continued)

OTHER PUBLICATIONS

International Search Report, PCT/JP2021/048883, Mar. 1, 2022, 5 pgs.

(Continued)

*Primary Examiner* — Filip Zec
(74) *Attorney, Agent, or Firm* — Volpe Koenig

(57) ABSTRACT

A rotating magnetic field generation device of the present invention includes: a magnetic field generating unit including disks in which a plurality of magnets are arranged circumferentially, a magnetic field working space formed by stacking the disks at intervals to make the plurality of magnets face each other, and a shaft to which the stacked disks are fixed, the shaft being installed at a central axis of the disks; an adiabatic vacuum vessel in which the magnetic field generating unit is installed; and a drive mechanism that is installed in a room temperature region and rotates the shaft.

12 Claims, 14 Drawing Sheets

(58) Field of Classification Search
CPC .. F25J 2270/904; F25J 2270/908; H01F 6/04; H01F 6/06; H01F 7/0273; F25B 21/00; F25B 2321/0022
See application file for complete search history.

(56) References Cited

U.S. PATENT DOCUMENTS

| | | | | |
|---|---|---|---|---|
| 9,927,155 | B2 * | 3/2018 | Boeder | F25B 21/00 |
| 10,684,044 | B2 * | 6/2020 | Schroeder | F25B 21/00 |
| 10,742,080 | B2 * | 8/2020 | Hsu | H02K 3/12 |
| 10,903,707 | B2 * | 1/2021 | Zeichfüssl | F03D 80/80 |
| 2007/0125094 | A1 | 6/2007 | Iwasaki et al. | |
| 2012/0256715 | A1 * | 10/2012 | Fullerton | H01F 7/02<br>335/285 |
| 2013/0099607 | A1 * | 4/2013 | Lendenmann | H02K 1/325<br>310/46 |
| 2013/0154397 | A1 * | 6/2013 | Sullivan | H02K 21/22<br>310/68 B |
| 2014/0130515 | A1 | 5/2014 | Tomimatsu et al. | |
| 2015/0054373 | A1 * | 2/2015 | Mane | H02K 3/12<br>310/181 |
| 2018/0005735 | A1 * | 1/2018 | Scharf | H01F 1/012 |
| 2018/0283740 | A1 * | 10/2018 | Holladay | H10N 15/20 |
| 2018/0283772 | A1 * | 10/2018 | Holladay | H01F 1/015 |
| 2018/0340715 | A1 * | 11/2018 | Benedict | F25B 21/00 |
| 2021/0135543 | A1 * | 5/2021 | Deak, Sr. | F03G 5/065 |

FOREIGN PATENT DOCUMENTS

| | | | |
|---|---|---|---|
| JP | H08-278066 | A | 10/1996 |
| JP | 2006-308197 | A | 11/2006 |
| JP | 2007-147209 | A | 6/2007 |
| JP | 2014-098495 | A | 5/2014 |
| JP | 2020-169806 | A | 10/2020 |

OTHER PUBLICATIONS

Written Opinion, PCT/JP2021/048883, Mar. 1, 2022, 11 pgs.
Matsumoto, K., et al., "Magnetic Refrigerator for Hydrogen Liquefaction," Teion Kogaku (J. Cryo. Super. Soc. Jpn.) vol. 50, No. 2, (2015), 6 pgs.
Saito, A., et al., "Characterization of an Active Magnetic Regenerative Cycle—Toward Room-temperature Application of AMR Cycle," Teion Kogaku (J. Cryo. Super. Soc. Jpn.) vol. 50, No. 2, (2015), 8 pgs.

* cited by examiner

ROTATING MAGNETIC FIELD GENERATION DEVICE, MAGNETIC REFRIGERATION DEVICE, AND HYDROGEN LIQUEFACTION DEVICE

TECHNICAL FIELD

The present invention relates to a rotating magnetic field generation device, a magnetic refrigeration device, and a hydrogen liquefaction device.

BACKGROUND ART

Recently, use of hydrogen has been considered as an important energy source for a decarbonized society. Hydrogen can be chemically bonded to oxygen to generate power, or burned to be used as thermal energy.

In order to realize a hydrogen society, it is necessary to construct a hydrogen supply chain for manufacturing, storage, and transportation of hydrogen in order to supply hydrogen to the society. When considering storage and transportation of hydrogen energy, since hydrogen gas has a low energy density, it is useful to utilize a form of liquid hydrogen having a four to five times higher density and a volume of ¼ to ⅕ of that of the hydrogen gas.

However, a liquefaction temperature of the liquid hydrogen is minus 253 degrees, and thus, approximately ⅓ of hydrogen energy is used for liquefaction and cold temperature retention.

Therefore, it is difficult to utilize merits unless the production efficiency of the liquid hydrogen is sufficiently high. The efficiency of existing hydrogen liquefaction plants is 20 to 40%, and there has been a demand for further improvement in the efficiency.

In recent years, highly efficient hydrogen liquefaction using a magnetocaloric effect has attracted attention. The magnetocaloric effect is a property resulting from the dependence on entropy and temperature of a magnetic body. When a magnetic field is applied to the magnetic body at a constant temperature, magnetic moments of the magnetic body are aligned by the magnetic field, and the entropy decreases. On the other hand, when the magnetic field is removed in an adiabatic state, heat is absorbed from the outside, and the magnetic moments become random. When this is operated in a Carnot cycle manner, cooling is performed by adiabatic demagnetization.

In a magnetic refrigeration device using the magnetocaloric effect, it is necessary to repeatedly apply and remove a magnetic field to and from a magnetic working substance (magnetic body) and to control a work fluid that exchanges heat with the magnetic working substance (magnetic body).

NPL 1 discloses an active magnetic regenerative (AMR).

The operation of the AMR includes the following four steps:

1) A magnetic field is applied to a magnetic working substance. 2) A work fluid flows in from one direction to exchange heat. 3) The magnetic field is removed. 4) The work fluid is caused to flow in the reverse direction to recover cold heat.

In NPL 1, a unit packed with the magnetic working substance reciprocates with respect to a fixed permanent magnet in a magnetic field space formed by the permanent magnet, thereby repeatedly applying and removing the magnetic field to and from the magnetic working substance.

In PTL 1 and PTL 2, application and removal of a magnetic field are repeated by rotating a magnetic field generator with respect to a fixed magnetic working substance.

Further, regarding a hydrogen liquefier using a magnetic refrigerator, a liquefaction device in which a multi-stage AMR and a Carnot magnetic refrigerator (CMR) for hydrogen condensation are combined is disclosed in the same NPL 1.

CITATION LISTS

Patent Literatures

PTL 1: JP 2006-308197 A
PTL 2: JP 2007-147209 A

Non-Patent Literature

NPL 1: TEION KOGAKU (J. Cryo. Super. Soc. Jpn.) Vol. 50 No. 2 (2015)

SUMMARY OF INVENTION

Technical Problem

By the way, when storage and transportation of hydrogen are carried out by the liquid hydrogen, not only the liquefaction efficiency but also sufficient liquefaction production capability are required.

In the magnetic refrigeration device, the amount of heat exchange is limited by the volume of the magnetic working substance in relation to the heat capacity per volume, and thus, it is necessary to enable installation of a large amount of the magnetic working substance. In order to apply a magnetic field to the large amount of the magnetic working substance, a large magnetic field working space is required for the volume of the large amount of the magnetic working substance. Further, the magnetic field is desirably as high as possible in order to effectively operate the magnetic working substance.

Further, it is necessary to increase the number of times of magnetic field action per unit time in order to increase the number of times of heat exchange per unit time.

According to the related art, a magnetic field working space is configured to be a single-layer magnetic field space formed by magnetic flux flowing out from a one-side pole of a permanent magnet, and it is difficult to scale up the magnetic field space.

Further, magnetic field strength is limited in the permanent magnet, and the principle of a magnetic refrigeration device using a solenoid superconducting electromagnet has also been demonstrated. When a superconducting magnet is used, a magnetic field having a magnetic flux density of 2 T (tesla) or more can be generated, but a magnetic field space is an inner space of a solenoid coil. Thus, it is necessary to cause the magnetic working substance or the superconducting magnet to reciprocate in order to apply and remove the magnetic field to and from the magnetic working substance, and the number of times of heat exchange per unit time is limited.

The present invention has been made in view of the above circumstances, and an object thereof is to provide a rotating magnetic field generation device capable of increasing a magnetic action volume per unit time with respect to a magnetic refrigeration device, the magnetic refrigeration device, and a hydrogen liquefaction device.

Solution to Problem

In order to solve the above problems, a rotating magnetic field generation device according to the present invention includes: a magnetic field generating unit including a disk in which a plurality of magnets are arranged circumferentially, a magnetic field working space formed by stacking the disks at intervals to make the plurality of magnets face each other, and a shaft to which the stacked disks are fixed, the shaft being installed at a central axis of the disks; an adiabatic vacuum vessel in which the magnetic field generating unit is installed; and a drive mechanism that is installed in a room temperature region and rotates the shaft.

Advantageous Effects of Invention

According to the present invention, it is possible to provide the rotating magnetic field generation device capable of increasing the magnetic action volume per unit time with respect to the magnetic refrigeration device, the magnetic refrigeration device, and the hydrogen liquefaction device.

DESCRIPTION OF EMBODIMENTS

Figure 1:
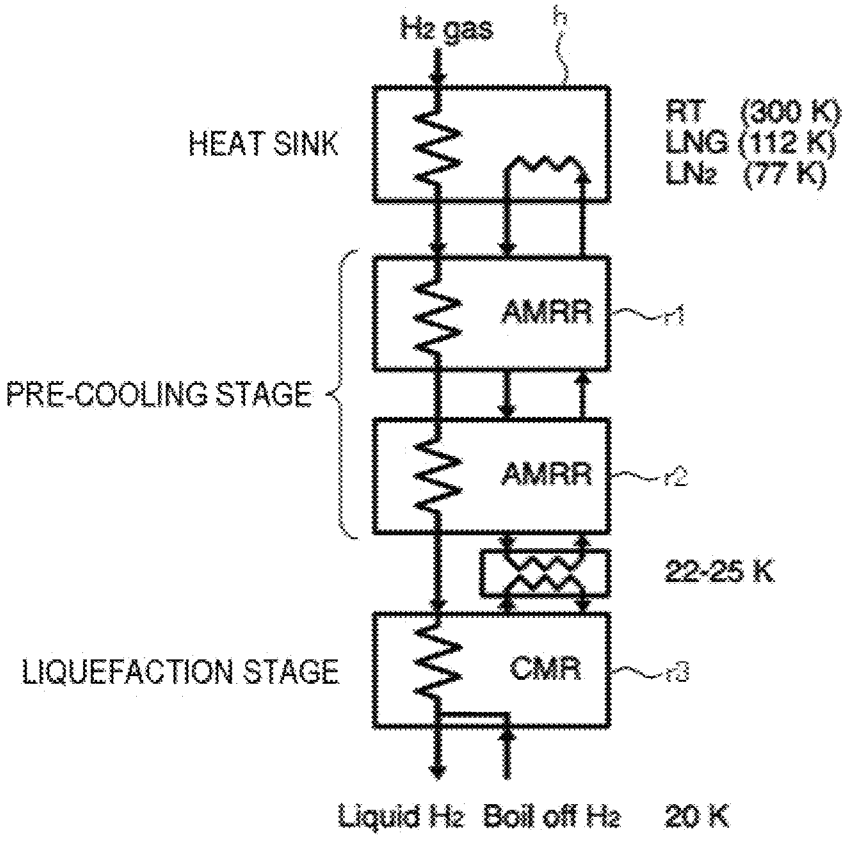
FIG. 1 is a diagram illustrating an example of a flow of hydrogen liquefaction.

The present invention relates to a magnetic refrigeration device utilizing a magnetocaloric effect, and more particularly to a magnet apparatus that repeatedly applies and removes a magnetic field to and from a magnetic working substance in multiple layers.

Hereinafter, an embodiment of the present invention will be described in detail while referring to the drawings as appropriate. However, the present invention is not limited to the embodiment to be described below, and can be appropriately combined, improved, and modified.

First, a hydrogen liquefaction step for reducing the volume of hydrogen in order to store and transport hydrogen will be described.

<Diagram of Hydrogen Liquefaction>

FIG. 1 illustrates a flow diagram of hydrogen liquefaction.

In the process of hydrogen liquefaction, hydrogen is liquefied by cooling using a multi-stage cooling apparatus from a pre-cooling stage r1 to a stage r3 for liquefaction (condensation) of hydrogen to lower the temperature. Note that FIG. 1 illustrates the pre-cooling stages r1 and r2 in two stages and the gen r3 in one stage.

In the pre-cooling stages r1 and r2, two stages of active magnetic regenerative refrigeration (AMRR) having different operating temperatures are connected in series. A high-temperature end of the AMRR of the pre-cooling stage r1 is connected to a heat sink h such as room-temperature atmosphere, LNG, or liquid nitrogen.

In each of the AMRRRs (the pre-cooling stages r1 and r2), heat is transferred by application and removal of a magnetic field and control of a working fluid transferring the heat, thereby forming a temperature gradient. A large temperature difference can be obtained as a whole by thermally coupling (heat exchange between) a low-temperature end and the high-temperature end sequentially in the respective AMRRs (pre-cooling stages r1 and r2) connected in multiple stages. The transferred heat is finally discarded into the heat sink h at the high-temperature end.

Hydrogen gas is liquefied by being subjected to cooling at the pre-cooling stages r1 and r2 of the AMRRs connected in multiple stages and recovery of latent heat at the last cooling stage (liquefaction stage r3). Although a Carnot magnetic refrigerator is illustrated here, an AMRR may be used.

<Schematic Diagram of Hydrogen Liquefaction Device E of Embodiment>

Figure 2:
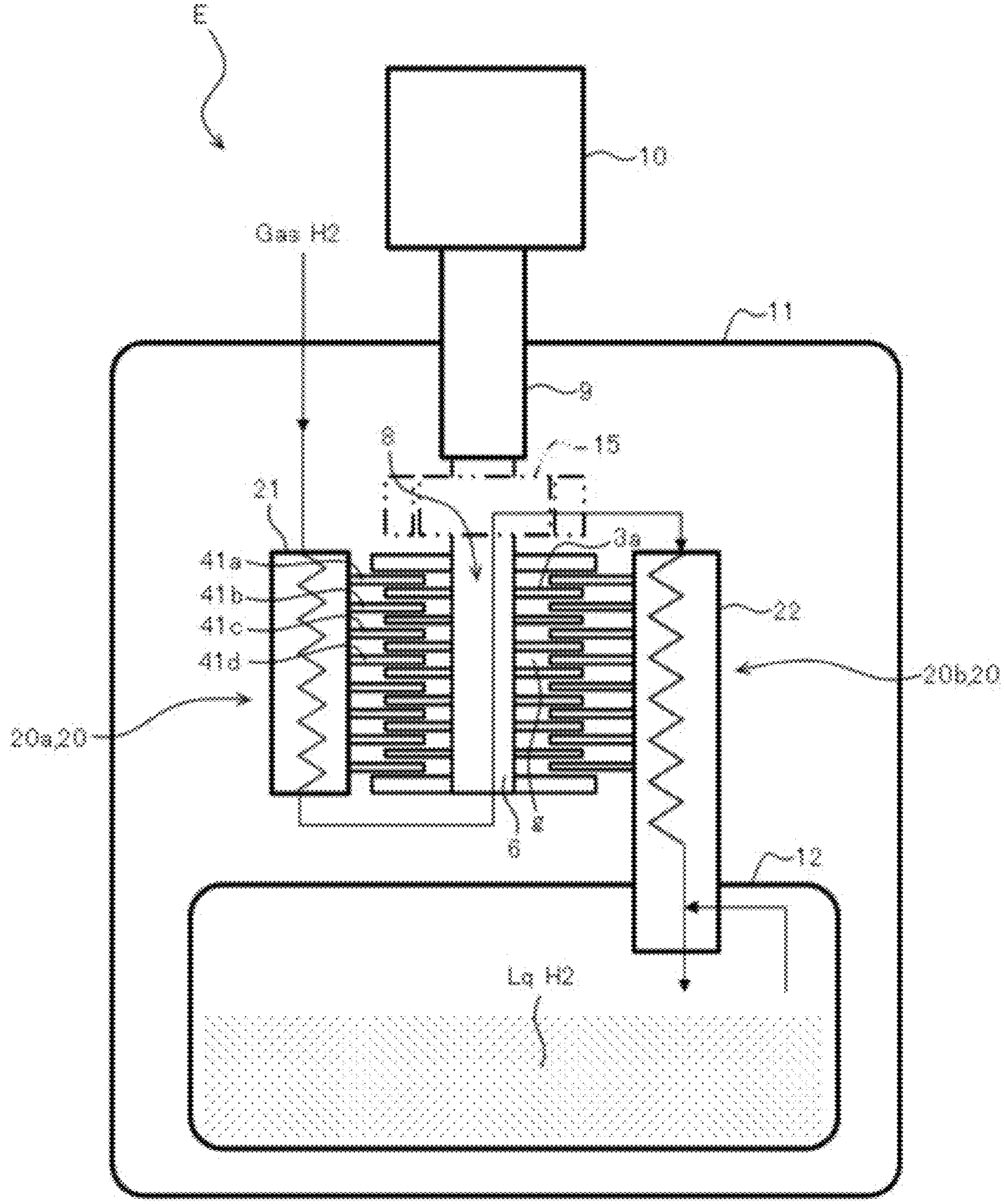
FIG. 2 is a conceptual diagram of a hydrogen liquefaction device according to an embodiment according to the present invention.
Figure 3:
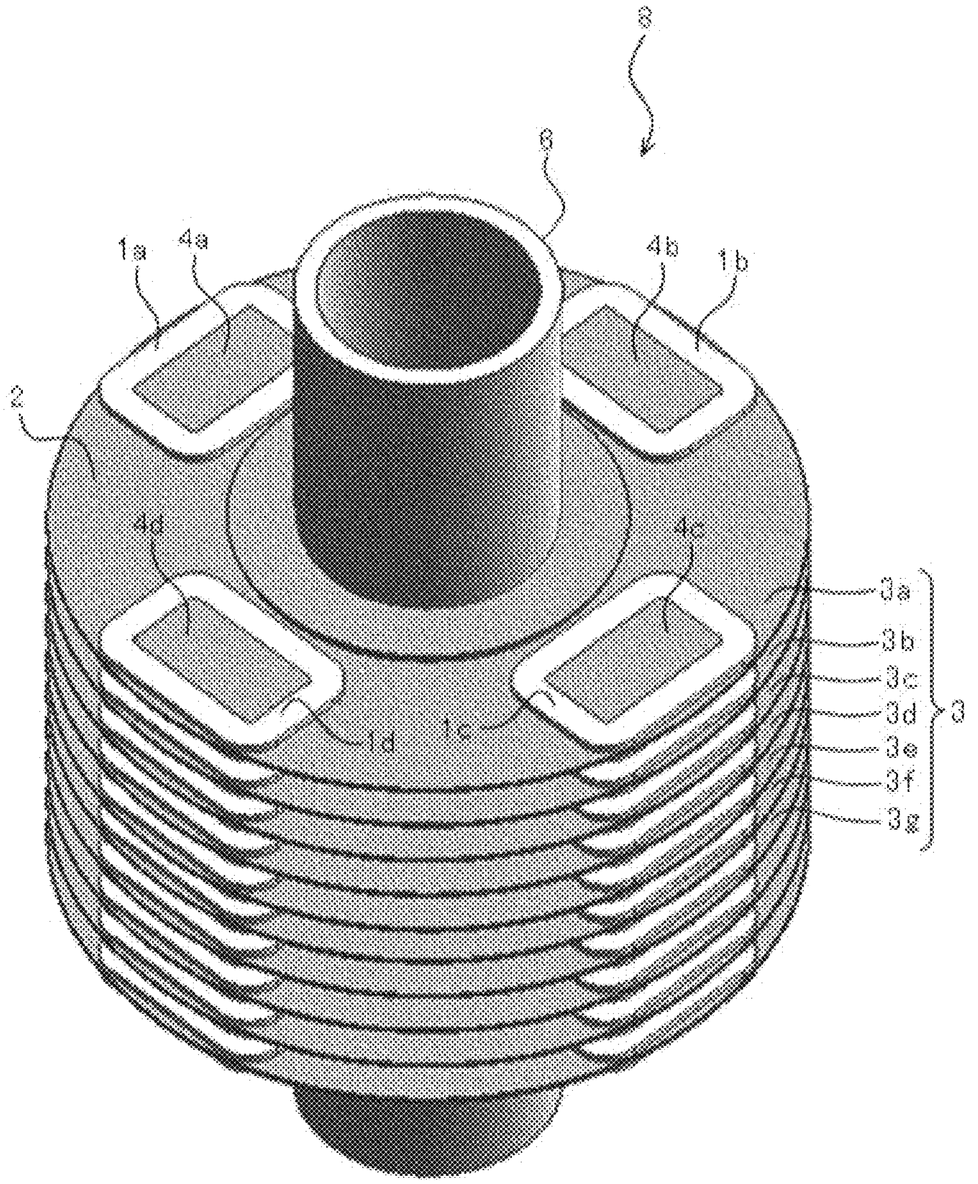
FIG. 3 is a perspective view of a rotating magnetic field generation device of the embodiment.

FIG. 2 is a conceptual diagram of a hydrogen liquefaction device E of the embodiment according to the present invention. FIG. 3 is a perspective view of a rotating magnetic field generation device 8 of the embodiment.

The hydrogen liquefaction device E of the embodiment is an apparatus that performs magnetic cooling of hydrogen by repeating application of a magnetic field to a magnetic working substance to generate heat and removal of the magnetic field to absorb the heat in multiple layers. The magnetic working substance has a magnetocaloric effect.

The hydrogen liquefaction device E includes a motor 10 for driving a magnet and a vacuum vessel 11.

The vacuum vessel 11 accommodates the rotating magnetic field generation device 8 driven by the motor 10.

As illustrated in FIG. 3, in the rotating magnetic field generation device 8, for example, a plurality of superconducting electromagnets (4*a*, 1*a*), (4*b*, 1*b*), (4*c*, 1*c*), and (4*d*, 1*d*) are provided on each of disks 3. Superconducting coils 1*a*, 1*b*, 1*c*, and 1*d* are cooled to a superconducting state by a cooling apparatus 15 (see FIG. 2).

A heat-insulating torque tube 9 is connected to the motor 10 for driving a magnet at a room temperature.

The rotating magnetic field generation device 8 is provided in the vacuum vessel 11 to be attached via the heat-insulating torque tube 9. The heat-insulating torque tube 9 is coupled to the motor 10 and rotated by the motor 10. The rotating magnetic field generation device 8 is rotationally driven by the motor 10 via the heat-insulating torque tube 9.

A coupling (for example, a magnetic fluid seal and not illustrated) that can retain vacuum and slide is installed between the vacuum vessel 10 and the heat-insulating torque tube 9.

<Rotating Magnetic Field Generation Device 8>

As illustrated in FIG. 3, a plurality of magnetic field generating means (4*a*, 1*a*), (4*b*, 1*b*), (4*c*, 1*c*), and (4*d*, 1*d*) are attached to disks (3*a* to 3*k*). Note that reference signs 3*h* to 3*k* are omitted in the drawing.

In the rotating magnetic field generation device 8, the disks (3*a* to 3*k*) are stacked with gaps g (see FIG. 2) such that the magnetic field generating means (4*a*, 1*a*), (4*b*, 1*b*), (4*c*, 1*c*), and (4*d*, 1*d*) face each other.

The magnetic field generating means are the exemplified superconducting electromagnets (4*a*, 1*a*), (4*b*, 1*b*), (4*c*, 1*c*), and (4*d*, 1*d*), or permanent magnets. In the present embodiment, an example using the superconducting electromagnets (4*a*, 1*a*), (4*b*, 1*b*), (4*c*, 1*c*), and (4*d*, 1*d*) as the magnetic field generating means will be described. When superconducting magnets are used as the magnets (4*a*, 1*a*), (4*b*, 1*b*), (4*c*, 1*c*), and (4*d*, 1*d*), energy consumption can be reduced.

As described above, the gaps g, which are magnetic field working spaces for applying magnetic fields to magnetic working substances, are formed among the stacked magnetic field generating means (4*a*, 1*a*), (4*b*, 1*b*), (4*c*, 1*c*), and (4*d*, 1*d*).

The magnetic field working space is, for example, a space between the disk (3*a*) to which the superconducting electromagnets (4*a*, 1*a*), (4*b*, 1*b*), (4*c*, 1*c*), and (4*d*, 1*d*) are attached and the disk (3*b*) to which the superconducting electromagnets (4*a*, 1*a*), (4*b*, 1*b*), (4*c*, 1*c*), and (4*d*, 1*d*) are attached. Further, the magnetic field working spaces are a space between the disk (3*b*) to which the superconducting electromagnets (4*a*, 1*a*), (4*b*, 1*b*), (4*c*, 1*c*), and (4*d*, 1*d*) are attached and the disk (3*c*) to which the superconducting electromagnets (4*a*, 1*a*), (4*b*, 1*b*), (4*c*, 1*c*), and (4*d*, 1*d*) are attached, and the like.

The disks 3 (3*a* to 3*k*) are integrated by a thermally conductive shaft 6 and are driven by the motor 10 (see FIG. 2). As the disks 3*a* to 3*k* of the rotating magnetic field generation device 8 rotate, the magnetic field working spaces (gaps g) rotate and move.

As illustrated in FIG. 2, AMRRs (41*a*, 41*b*, 41*c*, 41*d*, and so on) filled with the magnetic working substances are inserted into the gaps g as the magnetic field working spaces between the disks 3*a* and 3*b*, between the disks 3*b* and 3*c*, and so on.

For the AMRRs (41*a*, 41*b*, 41*c*, 41*d*, and so on), the magnetic working substance is selected in accordance with an operating temperature region. The magnetic working substances are grouped for each temperature region and arrayed in a line such that rotational phases are aligned in an axial direction (a direction of the shaft 6) of the rotating magnetic generator 8. High-temperature ends and low-temperature ends of the AMRRs (41*a*, 41*b*, 41*c*, 41*d*, and so on) are arrayed to be aligned and integrated by heat exchangers 21 and 22, respectively.

Hydrogen ($H_2$) gas introduced at a room temperature passes through the heat exchanger 21 of the AMRRs (41*a*, 41*b*, 41*c*, 41*d*, and so on) on a high temperature side and is pre-cooled. Thereafter, the hydrogen ($H_2$) gas is cooled and liquefied by the heat exchanger 22 (see FIG. 2) in the final stage, and is stored in a liquid hydrogen vessel 12. A part of the liquid hydrogen inside the liquid hydrogen vessel 12 evaporates but is recondensed in the heat exchanging device 22.

<Rotating Magnetic Field Generation Device 8>

The rotating magnetic field generation device 8 will be described.

Figure 4:
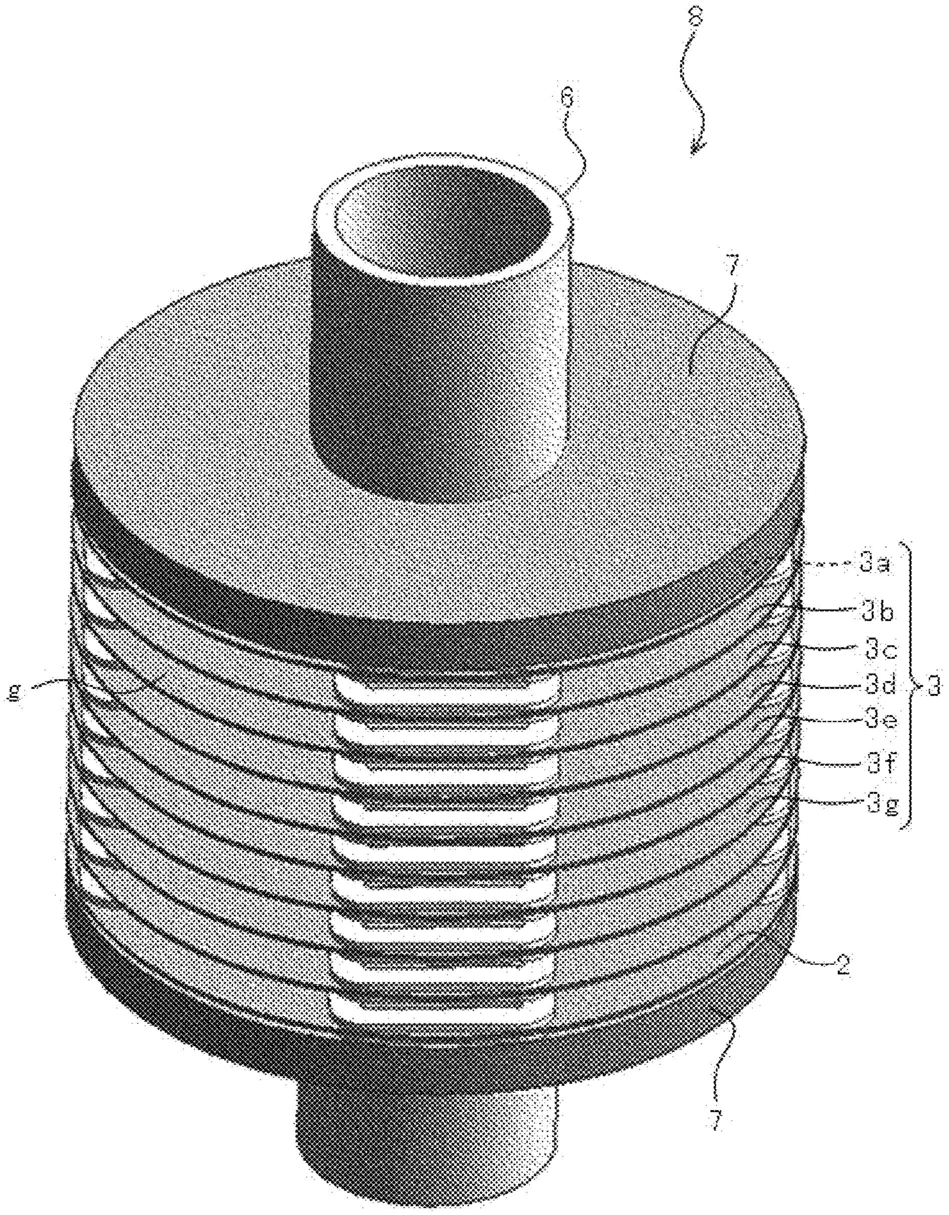
FIG. 4 is a perspective view of the rotating magnetic field generation device of the embodiment.
Figure 5:
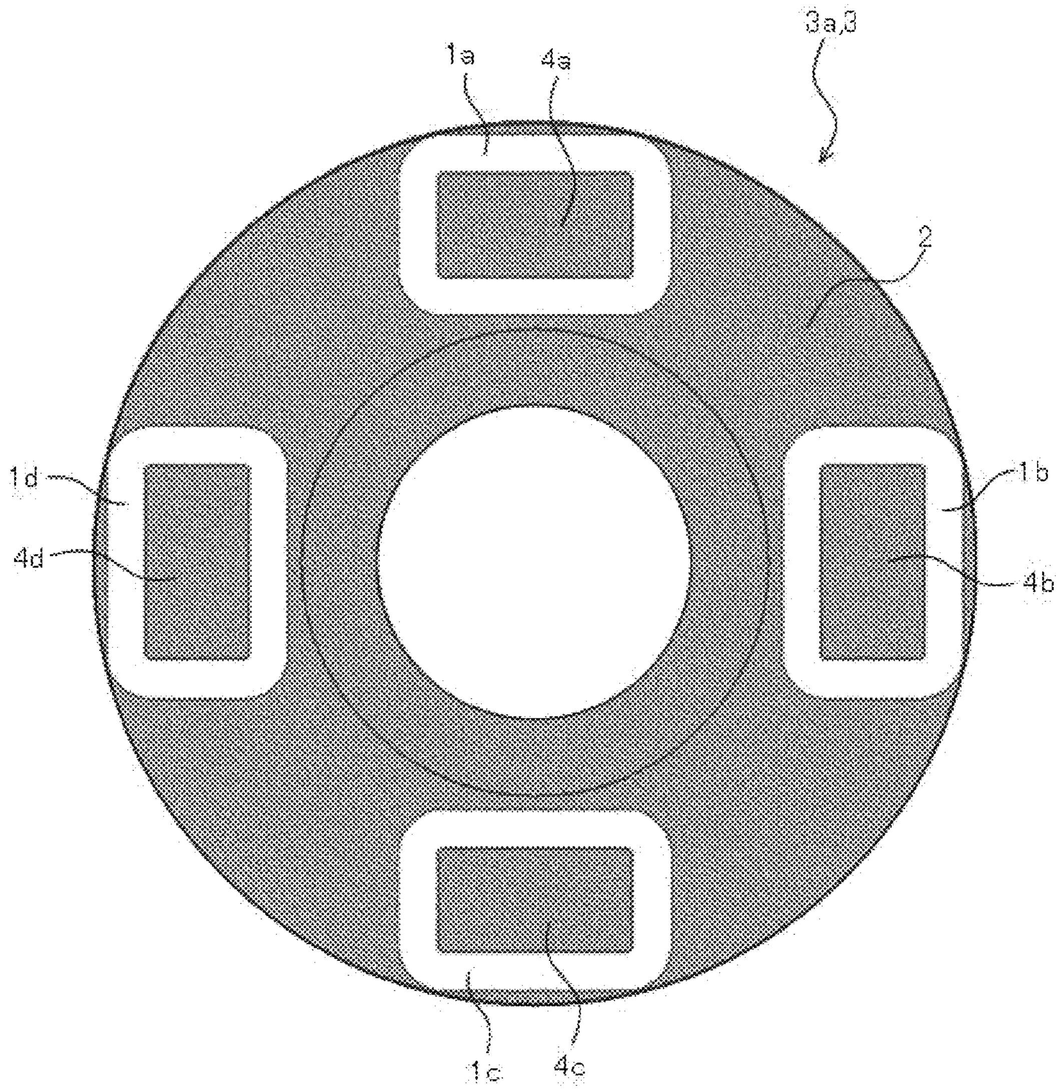
FIG. 5 is a plan view of a magnet disk of the embodiment.

FIG. 4 is a perspective view of the rotating magnetic field generation device 8 of the embodiment. FIG. 5 is a plan view of the magnet disk 3 of the embodiment.

The rotating magnetic field generation device 8 includes the magnet disks 3*a* to 3*k* that generate magnetic fields.

In each of the magnet disks 3*a* to 3*k*, the superconducting coils 1*a*, 1*b*, 1*c*, and 1*d* wound in flat plate shapes with iron cores 4*a*, 4*b*, 4*c*, and 4*d* as cores, respectively, are arranged on a disk 2 made of iron or stainless steel at a pitch of 90 degrees.

Figure 6:
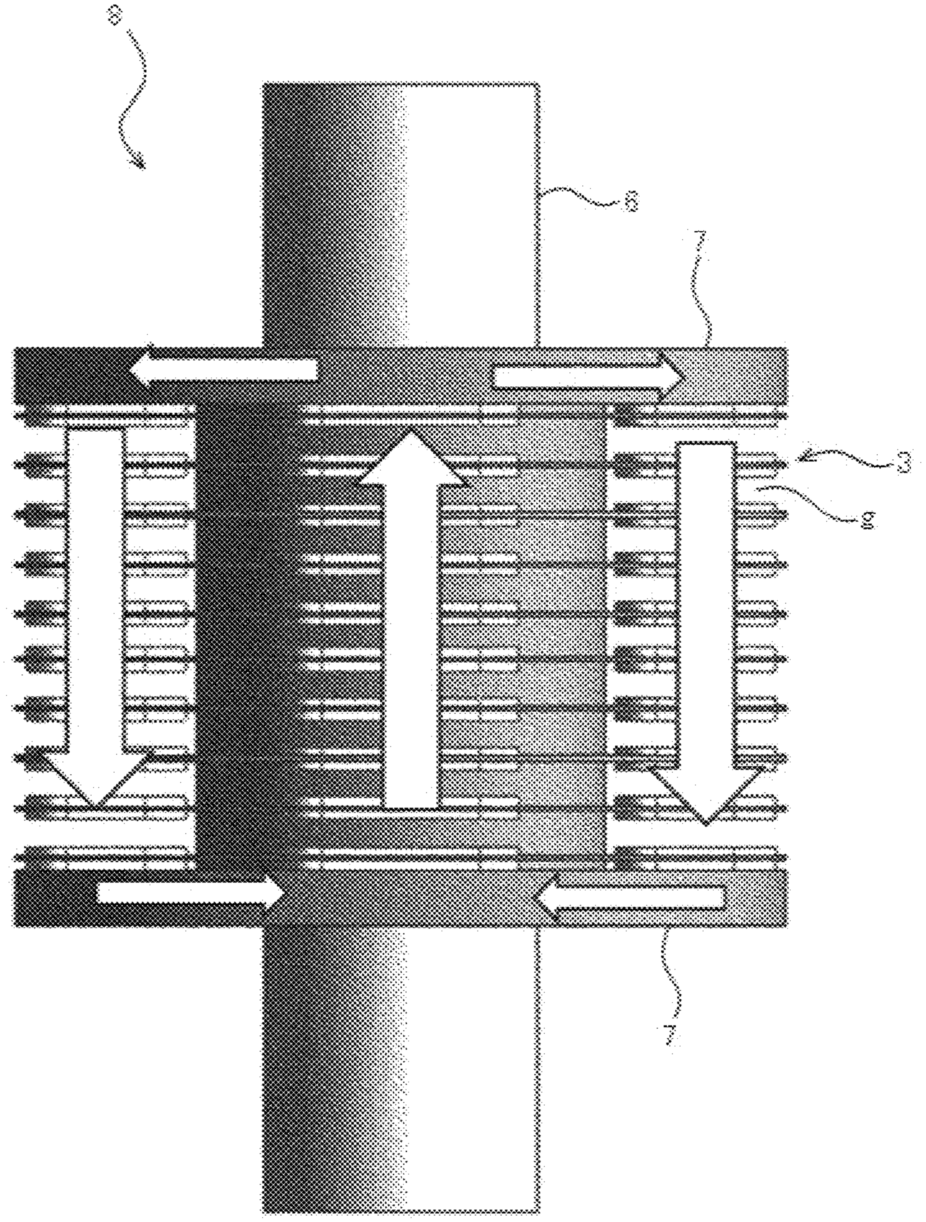
FIG. 6 is a conceptual view of a flow of magnetic flux in the rotating magnetic field generation device of the embodiment as viewed from the side.

The superconducting coils 1*a*, 1*b*, 1*c*, and 1*d* are arranged such that magnetic fields generated by the adjacent superconducting coils 1*a*, 1*b*, 1*c*, and 1*d* when a current is applied are opposite to each other as illustrated in FIG. 6. FIG. 6 is a conceptual view of a flow of magnetic flux in the rotating magnetic field generation device 8 of the embodiment as viewed from the side.

As described above, the magnet disks 3 (3*a* to 3*k*) are stacked with the gaps g.

As illustrated in FIG. 3, the magnet disks 3*a* to 3*k* are stacked in the up-down direction as follows.

Phases of the magnet disks 3 are arranged such that the magnetic flux generated by the superconducting coils 1*a*, 1*b*, 1*c*, and 1*d* is continuous in the axial direction of the rotating magnetic field generation device 8 (an extending direction of the thermally conductive shaft 6). Then, the magnet disks 3 are mechanically integrated with the thermally conductive shaft 6 as an axis.

The thermally conductive shaft 6 has a function of distributing cold heat to the superconducting coils 1*a*, 1*b*, 1*c*, and 1*d* in the axial direction using the shaft, and is made of copper.

The thermally conductive shaft 6 has functions of the mechanical integration of the magnet disks 3, transmission of a rotational force to the magnet disks 3, and a heat transfer path for cooling of the superconducting magnets (iron cores 4*a*, 4*b*, 4*c*, and 4*d* and superconducting coils 1*a*, 1*b*, 1*c*, and 1*d*). The thermally conductive shaft 6 is not necessarily made of copper, and may be made of a combination of a material having mechanical strength, for example, stainless steel or fiber reinforced plastics (FRP) and a high-purity aluminum tape having good thermal conduction.

The disk 2 constituting the magnet disk 3 is made of strong iron or stainless steel in order to support an attractive force between magnets, but copper having a high thermal conductivity may be used as the disk 2 when an electromagnetic force does not cause a problem.

When the disk 2 is made of copper, the superconducting coils 1*a*, 1*b*, 1*c*, and 1*d* can be cooled using the disk 2, which is desirable.

When the disk 2 is made of stainless steel and has poor thermal conduction, a cooling path appropriate for conductively cooling the superconducting coils 1*a*, 1*b*, 1*c*, and 1*d*, for example, a copper tape or an aluminum tape, is installed and thermally coupled to the thermally conductive shaft 6 (not illustrated).

On the magnet disk 3 illustrated in FIG. 3, polarities of the magnets (4*a*, 1*a*), (4*b*, 1*b*), (4*c*, 1*c*), and (4*d*, 1*d*) are alternately arrayed in a circumferential direction of the disk as illustrated in FIG. 6.

Focusing on a certain phase of the rotating magnetic field generation device 8, the magnetic flux is continuous in the axial direction and appears to be one bar magnet. When the rotating magnetic field generation device 8 is viewed as a whole, the rod magnets appear to be arrayed while varying polarities.

As illustrated in FIG. 6, when the magnet as a whole has a magnetic moment of zero, there is no magnetic loss, so that a leakage magnetic field of the rotating magnetic field generation device 8 (see FIG. 4) as a whole can be suppressed to be small.

When an end yoke 7 made of an iron disk is installed at an end portion of the rotating magnetic field generation device 8 in the axial direction, the magnetic fields pass through the end yoke 7, which is a magnetic body, at high density, and a leakage of a magnetic field from the end portion can be suppressed.

Further, it is advantageous since magnetic field strength of the magnetic field working space close to the end portion of the rotating magnetic field generation device 8 is enhanced (increased). Further, when the magnet disk 3 is made of a tape wire material of a copper oxide superconducting material, superconducting current transport characteristics in the superconducting coils 1*a*, 1*b*, 1*c*, and 1*d* as superconductors deteriorate due to a magnetic field in a direction perpendicular to a tape surface. The magnetic fields concentrate and pass along an extending direction of the end yoke 7 by the end yoke 7, and magnetic field strength of a vertical component applied to the superconducting coils 1*a*, 1*b*, 1*c*, and 1*d* at the end portion can be reduced. Therefore, more current can flow through the superconducting coils 1*a*, 1*b*, 1*c*, and 1*d*, which is advantageous in generating a magnetic field.

The shape of the magnet is desirably a flat plate shape. When a gap (the gap g) between the magnets is wider than an opening area (area of the magnetic flux vertically passing through each of iron cores 4*a*, 4*b*, 4*c*, and 4*d*) of each of the magnets, the magnetic flux is diffused to the outer side of the magnet, so that it is difficult to generate a magnetic field having sufficient strength for the magnetic working substance to operate in the magnetic field working space. Therefore, a dimension of the magnet opening is desirably four times or more the gap between the magnets. Meanwhile, a magnet height (dimension in a direction in which the magnetic flux passes through each of iron cores 4*a*, 4*b*, 4*c*, and 4*d*) and the gap (gap g) between the magnets are desirably about the same.

According to the rotating magnetic field generation device 8 described above, the magnet disks 3 are configured in multiple layers, and thus, it is possible to excite and demagnetize a large amount of magnetically acting substances. Therefore, cooling can be performed in multiple stages with a small volume.

<Type of Magnet>

Although the superconducting coils 1*a*, 1*b*, 1*c*, and 1*d* have been exemplified as the configuration of the magnet disk 3, a magnetic field that needs to be generated in a magnetic action space differs depending on a type of a magnetic working substance. When a magnetic field of less than 1 T is sufficient, it is convenient to use a permanent magnet. When the magnetic field is about 2 T, a MgB2 superconducting material is suitable due to a cost merit. When a magnetic field of 3 to 5 T is required, a coil using an oxide high-temperature superconducting material such as REBCO (copper oxide superconductor) is used.

When the electromagnets (1*a*, 4*a*), (1*b*, 4*b*), (1*c*, 4*c*), and (1*d*, 4*d*) are used, it is necessary to supply a current from the outside. However, it is not desirable to energize the superconducting coils 1*a*, 1*b*, 1*c*, and 1*d* using a slip ring by rotating the rotating magnetic field generation device 8 because heat generation due to sliding with the superconducting coils 1*a*, 1*b*, 1*c*, and 1*d*, Joule heat generation, and the like occur, and heat is input to the environment of a magnetic refrigeration device (the hydrogen liquefaction device E).

When the superconducting coils 1*a*, 1*b*, 1*c*, and 1*d* are used, the superconducting coils 1*a*, 1*b*, 1*c*, and 1*d* are configured to operate in a persistent current mode like permanent magnets.

<Module Coil>

Figure 7:
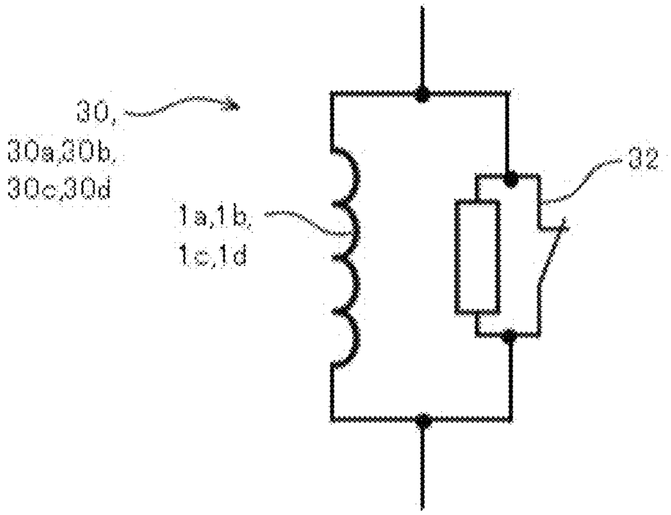
FIG. 7 is a conceptual circuit diagram of a module coil.
Figure 8:
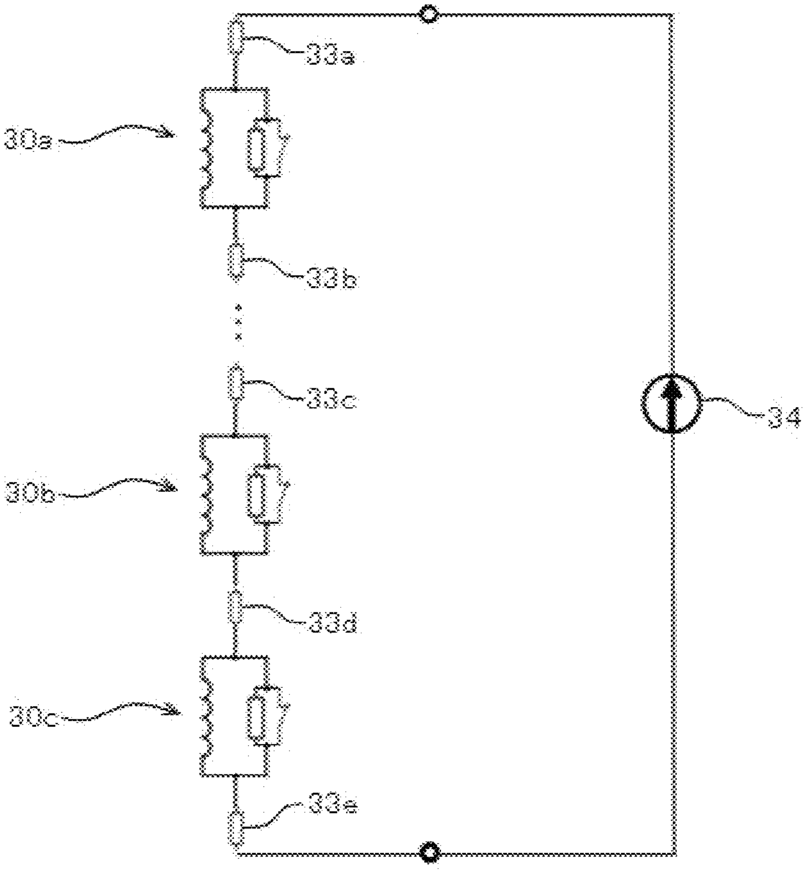
FIG. 8 is a circuit diagram of an excitation circuit using the module coil.

FIGS. 7 and 8 illustrate a concept of a module coil in which a superconducting electromagnet is used as a permanent magnet.

FIG. 7 illustrates a conceptual circuit diagram of a module coil 30.

The module coil 30 (30*a*, 30*b*, or 30*c*) is a unit coil in which the superconducting coils 1*a*, 1*b*, 1*c*, and 1*d* are short-circuited by a persistent current switch 32.

FIG. 8 illustrates a circuit diagram of an excitation circuit using the module coils 30*a*, 30*b*, and 30*c*.

The circuit connecting the module coils 30*a*, 30*b*, and 30*c* is normally conducted and has electric resistances 33*a*, 33*b*, 33*c*, 33*d*, and 33*e*. The module coils 30*a*, 30*b*, and 30*c* operate in a persistent current mode and behave like permanent magnets. During the operation of the module coils 30*a*, 30*b*, and 30*c*, a power supply 34 is disconnected so that individual circuits are formed as electric circuits.

In the case of a magnet apparatus in which the number of coils (the superconducting coils 1*a*, 1*b*, 1*c*, and 1*d*) is large and wiring between the coils (superconducting coils 1*a*, 1*b*, 1*c*, and 1*d*) is complicated as in the rotating magnetic field generation device 8 which is a magnet apparatus, it is extremely difficult to connect the respective coils (superconducting coils 1*a*, 1*b*, 1*c*, and 1*d*) with superconducting wiring and to make a superconducting connection. Magnets can be easily configured by connecting the modularized superconducting coils 1*a*, 1*b*, 1*c*, and 1*d* operating in the persistent current mode in normal conduction. Due to the operation in the persistent current mode, the resistance becomes zero, and thus, power is not required.

The superconducting magnets constituting the magnet disk 3 may be configured to operate in the persistent current mode in units of coils, or the superconducting coils 1*a*, 1*b*, 1*c*, and 1*d* mounted on one magnet disk 3 may be configured to operate in the persistent current mode as a whole.

It is necessary to connect the external power supply 34, which is an excitation power supply, and to supply a current in order to excite even the module coils 30*a*, 30*b*, 30*c*, and so on. In the magnets of the rotating magnetic field generation device 8, power leads (not illustrated) configured to excite the module coils 30*a*, 30*b*, 30*c*, and so on are installed on the thermally conductive shaft 6, and the module coils 30*a*, 30*b*, 30*c*, and so on are excited through the power leads. The rotating magnetic field generation device 8 is stopped at the moment of exciting each of the module coils 30*a*, 30*b*, 30*c*, and so on. After the module coils 30*a*, 30*b*, 30*c*, and so on are excited by connecting the external power supply 34, which is the excitation power supply, as illustrated in FIG. 8, the external power supply 34 is removed, and then, the rotating magnetic field generation device 8 is rotated.

Each of the module coils 30*a*, 30*b*, 30*c*, and so on operating in the persistent electric mode in which the external power supply 34 is disconnected is equivalent to the permanent magnet.

Since the magnets (4a, 1a), (4b, 1b), (4c, 1c), and (4d, 1d) (see FIG. 3) operate in the state of being completely separated from the outside, the stored energy when the superconducting coils 1a, 1b, 1c, and 1d are quenched needs to be consumed in the magnets. The superconducting coils 1a, 1b, 1c, and 1d are desirably non-insulating windings for self-protection.

<Installation of AMRR (40)>

Figure 9:
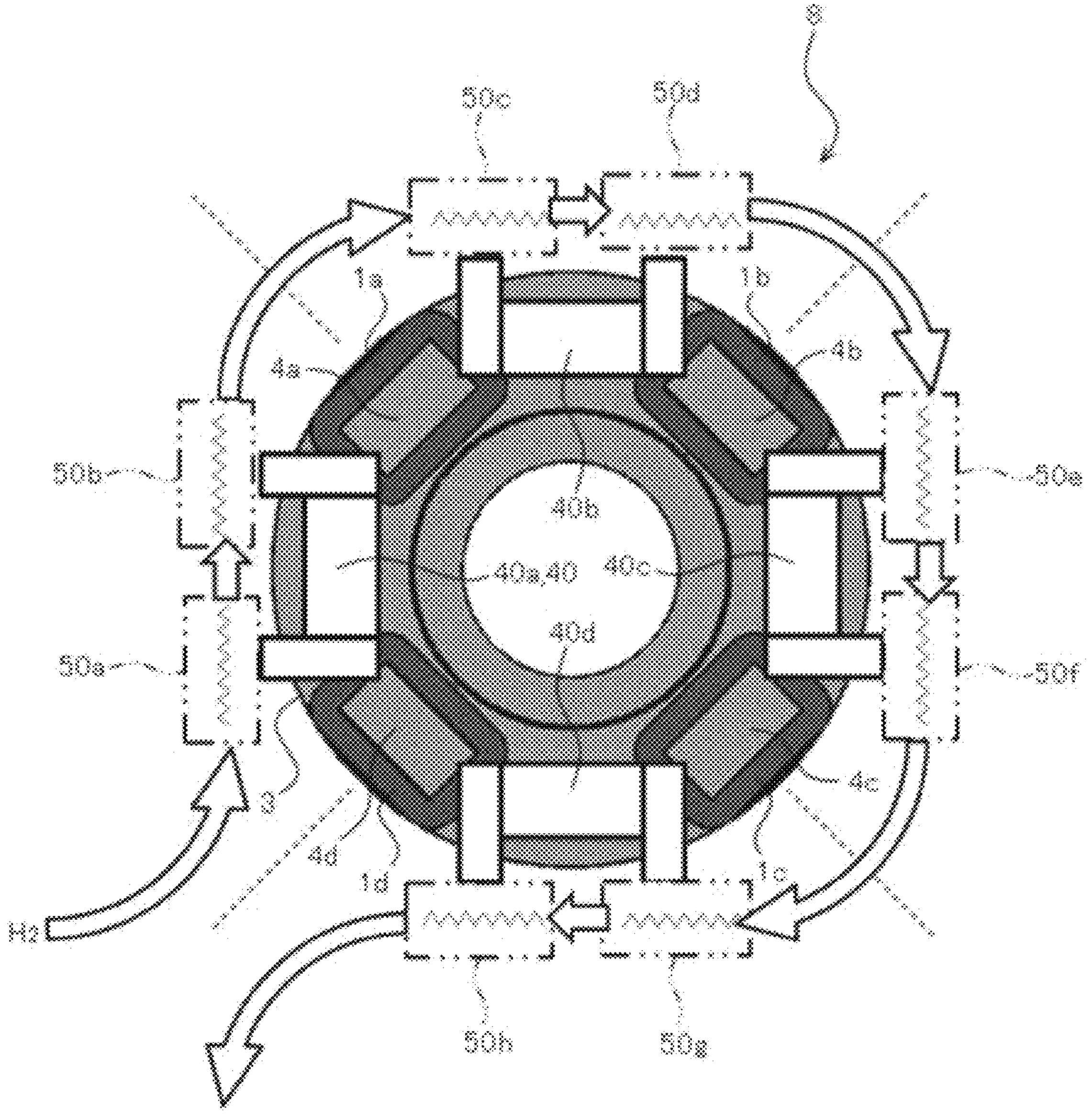
FIG. 9 is a top view of an arrangement of AMRR units of the embodiment.
Figure 10:
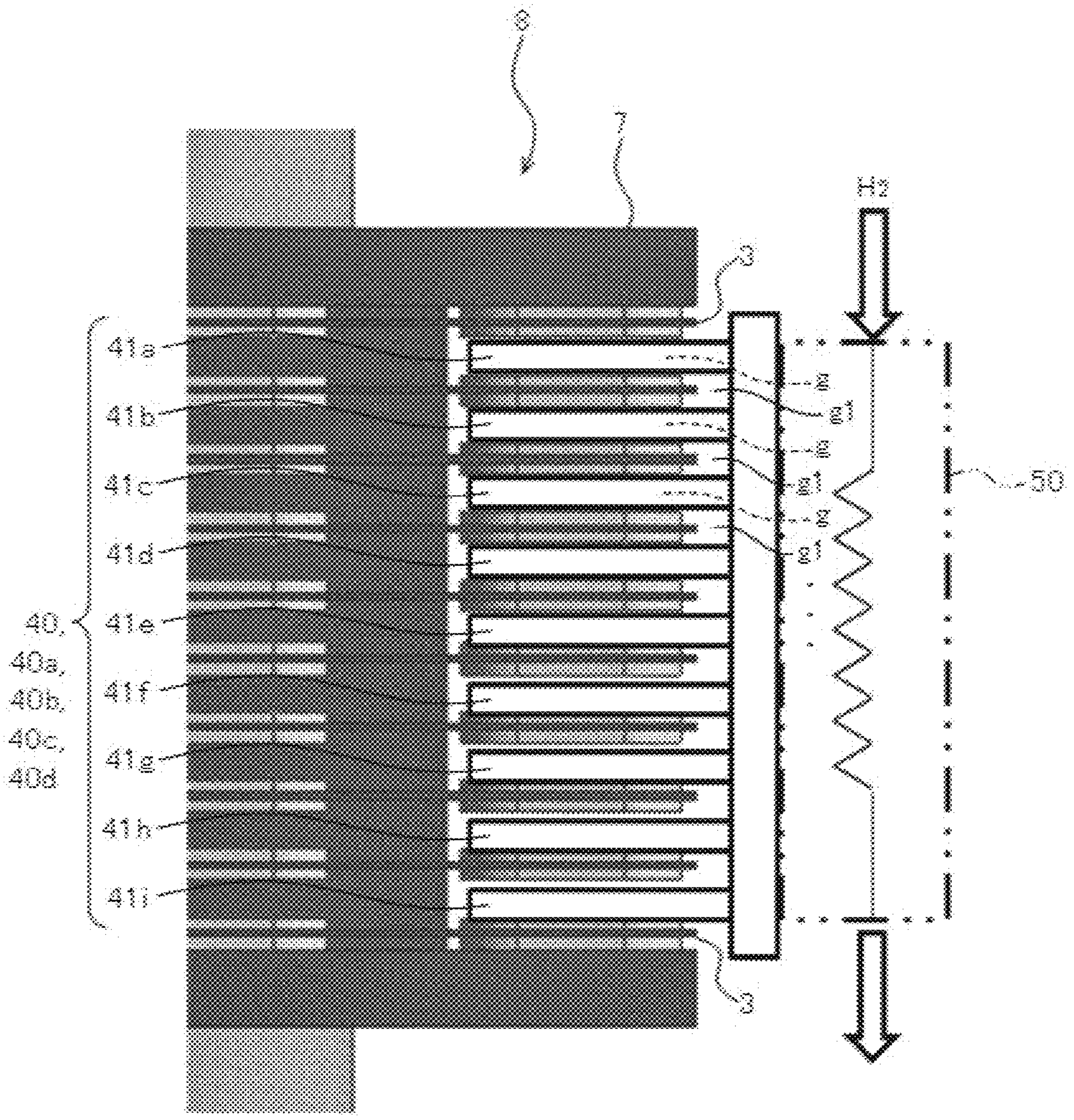
FIG. 10 is a side view of the arrangement of the AMRR units of the embodiment.

FIGS. 9 and 10 illustrate a positional relationship between an AMRR (40) and the rotating magnetic field generation device 8.

FIG. 9 illustrates a top view of an arrangement of an AMRR unit 40 of the embodiment.

FIG. 10 illustrates a side view of the arrangement of the AMRR units 40 of the embodiment.

Figure 11:
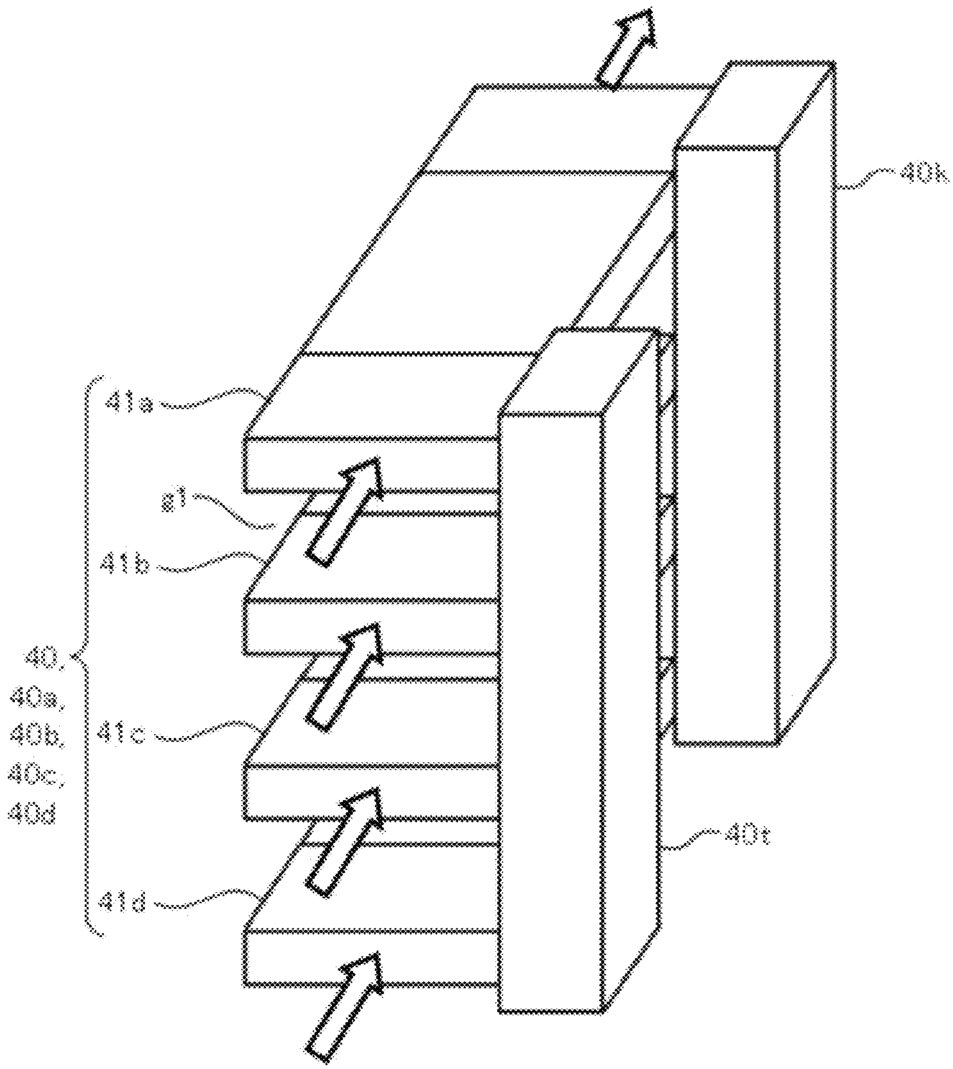
FIG. 11 is a perspective view of a schematic structure of the AMRR units of the embodiment.

FIG. 11 illustrates a perspective view of a schematic structure of the AMRR units 40 of the embodiment.

In each of the AMRR units 40 (40a, 40b, 40c, and 40d) illustrated in FIG. 9, unit AMRRs 41a, 41b, 41c, 41d, and so on filled with magnetic working substances are accumulated side by side in one direction as illustrated in FIGS. 10 and 11.

The unit AMRRs 41a, 41b, 41c, 41d, and so on contain a working fluid which transfers heat of the magnetic working substances together with the magnetic working substances, respectively.

As the magnetic working substance, for example, $DyAO_2$, $GdNi_2$, $ErCO_2$, or the like is used.

As the working fluid, for example, helium gas or the like is used.

Outlined arrows in FIG. 11 illustrate how the working fluid moves to transfer cold heat to form a high temperature side and a low temperature side.

As illustrated in FIG. 11, a high-temperature AMRR unit 40k and a low-temperature AMRR unit 40t are thermally coupled and integrated to form the AMRR unit 40 (40a, 40b, 40c, or 40d).

As illustrated in FIG. 11, each of the unit AMRRs 41a to 41i (reference signs 41a to 41d are illustrated in FIG. 11) is provided with a gap g1 like a comb tooth so as to be inserted between the magnet disks 3 of the rotating magnetic field generation device 8 as illustrated in FIG. 10. The unit AMRRs 41a to 41i are inserted and installed among the magnet disks 3 so as not to come into contact with the magnet disks 3. With this configuration, it is possible to excite and demagnetize a large amount of magnetically acting substances. Further, by arranging the unit AMRRs 41a, 41b, 41c, and so on in the axial direction, a lot of cold heat that can be taken out.

As illustrated in FIG. 9, the AMRR units 40 (40a, 40b, 40c, and 40d) are arranged in the circumferential direction so as to correspond to positions of the magnets of the disk magnet 3. With this configuration, it is possible to efficiently use the magnetic fields of the magnets (4a, 1a), (4b, 1b), (4c, 1c), and (4d, 1d).

Each of the AMRR units 40a, 40b, 40c, and 40d is responsible for cooling in a certain temperature range, and is arranged from the high temperature side to the low temperature side along a flow of hydrogen gas (outlined arrows in FIG. 9) as illustrated in FIG. 9. Since the plurality of AMRR units 40a, 40b, 40c, and 40d are provided, the cooling process can be increased. An origin side of the outlined arrow in FIG. 9 is the high temperature side, and a tip side of the outlined arrow in FIG. 9 is the low temperature side.

As illustrated in FIG. 11, the working fluid placed in the unit AMRRs 41a to 41i moves as indicated by the arrows, thereby moving the cold heat of the magnetically acting substances from the high temperature side to the low temperature side.

Specifically, when the magnet disks 3 of the rotating magnetic field generation device 8 rotate and the AMRR units 40 are excited by the magnets (4a, 1a), (4b, 1b), (4c, 1c), and (4d, 1d), the magnetic working substances generate heat. Therefore, the working fluid is moved in a direction opposite to the outlined arrows in FIG. 9 to move the heat to the higher temperature side.

On the other hand, when the magnets (4a, 1a), (4b, 1b), (4c, 1c), and (4d, 1d) of the AMRR units 40 are moved and demagnetized, the magnetic working substances absorb heat, and thus, the working fluid is moved in the direction of the outlined arrows in FIG. 9 to move the cold heat to the lower temperature side. As a result, the working fluid is moved by repetition of excitation and demagnetization of the AMRR units 40 to generate a temperature gradient in the direction of the outlined arrows in FIG. 9. The working fluid is moved by applying pressure by opening and closing a valve.

For assembly reasons, it is desirable that the AMRR unit 40 can be inserted and set from the outer peripheral side of the rotating magnetic field generation device 8. Therefore, the unit AMRRs 41a, 41b, 41c, and so on that are responsible for the same temperature are accumulated in the axial direction. However, the present invention is not necessarily limited thereto, and the unit AMRRs 41a to 41i that are responsible for the same temperature may be arranged in the circumferential direction.

Note that the plurality of magnetic working substances responsible for temperature ranges up to hydrogen liquefaction are arranged in one rotating magnetic field generation device 8, but it is not always necessary to provide the AMRR units 40a, 40b, 40c, and 40d with the plurality of temperature regions, and the single AMRR unit 40 may be installed.

According to the hydrogen liquefaction device E described above, a magnetic action volume per unit time can be increased in the magnetic refrigeration device using the magnetocaloric effect. Therefore, a large amount of hydrogen can be efficiently liquefied.

<Modification>

Figure 12:
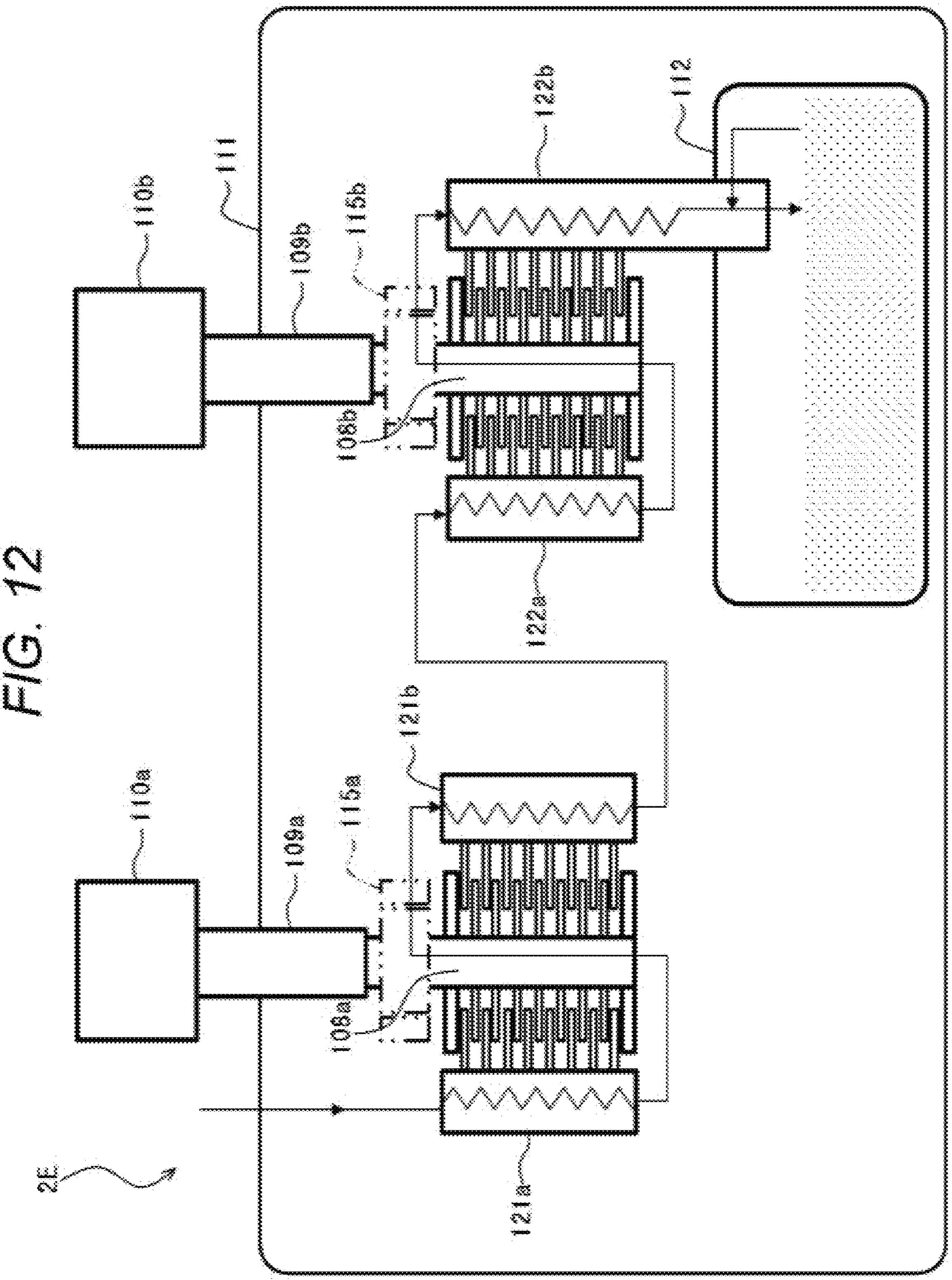
FIG. 12 is a conceptual diagram of a hydrogen liquefaction device including a plurality of rotating magnetic field generation devices according to a modification.

FIG. 12 is a conceptual diagram of a hydrogen liquefaction device 2E including a plurality of rotating magnetic field generation devices 108a and 108b according to a modification. In the modification, constituent elements of the embodiment are denoted by reference numerals in a hundred series, and the description of the similar configuration is omitted.

As illustrated in FIG. 12, in the hydrogen liquefaction device 2E of the modification, the plurality of rotating magnetic field units 108a and 108b are installed in one adiabatic vacuum vessel 111.

Then, AMRR units 121a and 121b having different operation temperature regions are arranged with respect to the rotating magnetic field unit 108a. Further, AMRR units 122a and 122b having different operation temperature regions are arranged with respect to the rotating magnetic field unit 108b.

<Calculation Example of Magnetic Field in Case of REBCO>

In a case where a rectangular coil having a short-side distance of 150 mm and a long-side distance of 80 mm is wound around an iron core by a double-pancake coil with a superconducting tape wire material having a width of 4 mm, thereby forming a magnet with a gap of 20 mm, when a coil current density is 200 $A/mm^2$, it is possible to form a working magnetic field space in which a generated magnetic field at a central portion of the rotating magnetic field generation device 8 is approximately 3.5 T and a working magnetic field space on an end portion side is approximately 2.7 T.

<Modification 1>

Figure 13:
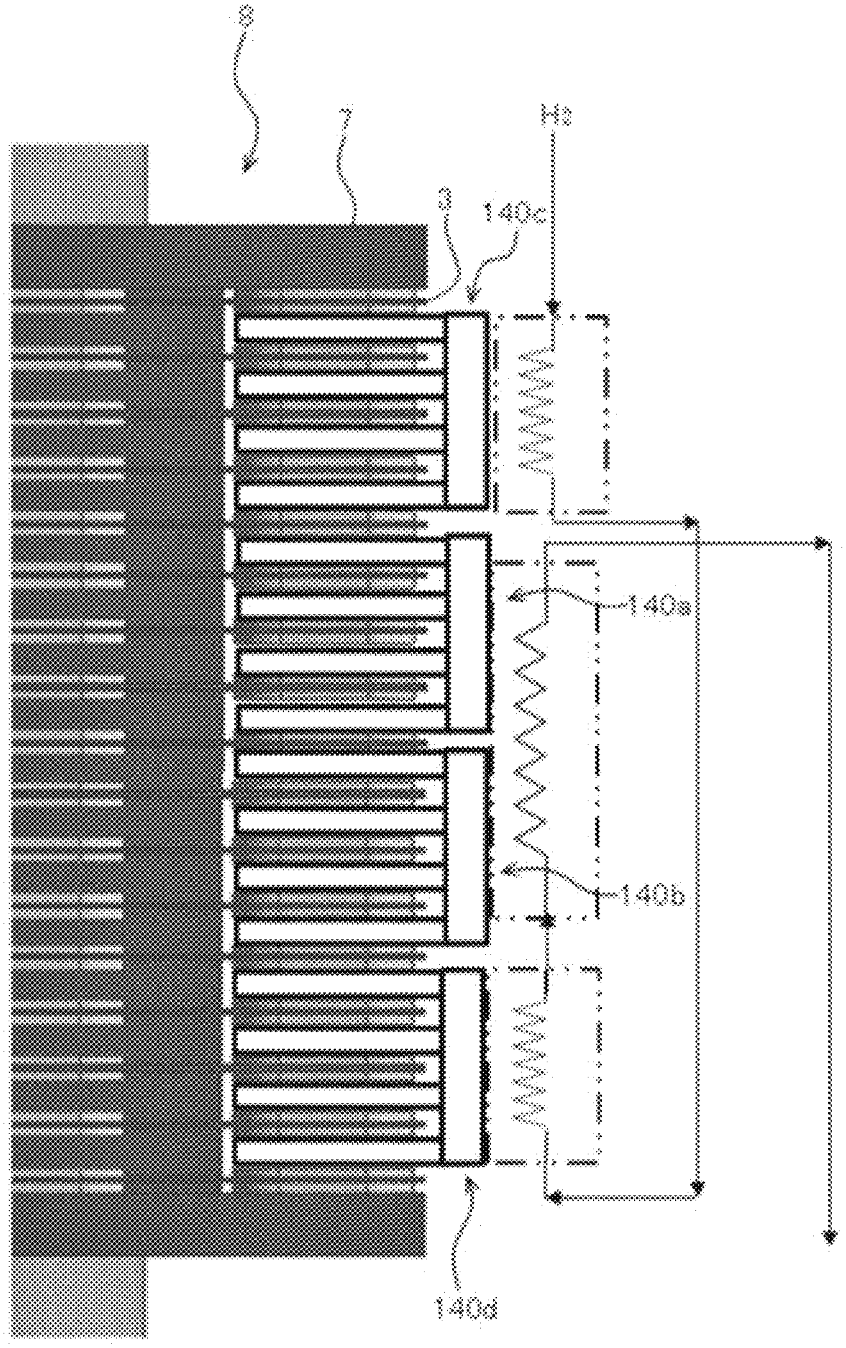
FIG. 13 is a view illustrating an arrangement of AMRR units having magnetic working substances of which appropriate magnetic field strengths are different according to Modification 1.

FIG. 13 illustrates an arrangement of AMRR units 140*a*, 140*b*, 140*c*, and 140*d* having magnetic working substances of which appropriate magnetic field strengths are different according to Modification 1.

It is necessary to set an appropriate magnetic field strength by the magnetic working substance. If a magnetic working substance requires a relatively high magnetic field, the AMRR units 140*a* and 140*b* utilizing the magnetic working substance are arranged on the central side of a magnet. The AMRR units 140*c* and 140*d* in which the magnetic working substance requires a relatively low magnetic field are arranged on an end portion side of the magnet. In this manner, it is desirable to perform the arrangement from the viewpoint of utilization of the magnetic field so as to have an appropriate magnetic field strength according to the magnetic working substance.

In this case, the AMRR units 140*a*, 140*b*, 140*c*, and 140*d* are divided and installed so as to correspond to a plurality of temperature regions in the axial direction as illustrated in FIG. 13.

According to Modification 1, the AMRR units 140*a*, 140*b*, 140*c*, and 140*d* can be arranged at matching magnetic field strengths.

<Reduction of External Power Due to Reduction of Torque Pulsation>

In the magnetic refrigeration device (hydrogen liquefaction device E) according to the embodiment, a refrigeration operation is performed by rotating the rotating magnetic field unit 8 by the motor 10, which is external power, to apply a magnetic field to a magnetic working substance. The magnetic working substance is a magnetic body. Heat removal and liquefaction of an object to be liquefied are performed by changing magnetization of the magnetic working substance by energy input from the outside.

Since a force is generated by the interaction between the magnets (4*a*, 1*a*), (4*b*, 1*b*), (4*c*, 1*c*), and (4*d*, 1*d*) and the magnetic body (magnetic working substance), torque is required to rotate the rotating magnetic field generation device 8. Work that does not contribute to cooling and that acts against the attractive force acting between the magnet and the magnetic working substance should be reversible since the work is not performed, but in practice, losses are generated by torque that does not contribute to cooling due to a loss in the driving motor 10 and the like.

It is important to reduce the generation of the torque in order to reduce the losses, and it is desirable to reduce the torque by arranging the magnets (4*a*, 1*a*), (4*b*, 1*b*), (4*c*, 1*c*), and (4*d*, 1*d*), to be arranged on the magnet disk 3, as close as possible to the central axis. Further, it is also effective to suppress pulsation of the torque.

In order to suppress the pulsation of the torque, it is effective to adjust a positional relationship between the magnet and the magnetic working substance such that a force acting between each of the magnet (4*a*, 1*a*), (4*b*, 1*b*), (4*c*, 1*c*), and (4*d*, 1*d*) and the magnetic working substance becomes constant.

<Modification 2>

Figure 14:
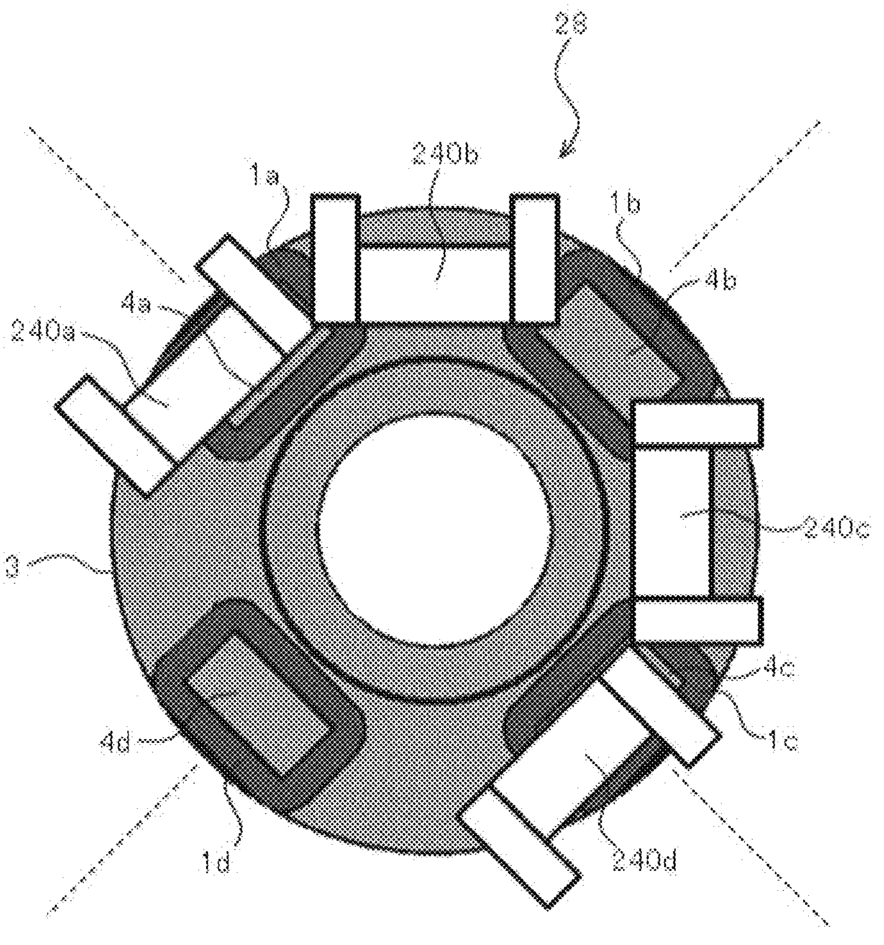
FIG. 14 is a top view of a positional relationship between an AMRR unit and a magnet of a rotating magnetic field unit according to Modification 2.

FIG. 14 illustrates a top view of a positional relationship among AMRR units 240*a*, 240*b*, 240*c*, and 240*d* and the magnets (4*a*, 1*a*), (4*b*, 1*b*), (4*c*, 1*c*), and (4*d*, 1*d*) of a rotating magnetic field unit 28 of Modification 2.

In Modification 2, a phase of a magnetic working substance filled in each of the AMRR units 240*a*, 240*b*, 240*c*, 240*d* of the rotating magnetic field unit 28 is shifted from a phase of each of the magnets (4*a*, 1*a*), (4*b*, 1*b*), (4*c*, 1*c*), and (4*d*, 1*d*). With this arrangement, when the magnet disk 3 rotates, the magnetic working substances of the AMRR units 240*a*, 240*b*, 240*c*, and 240*d* and the magnets (4*a*, 1*a*), (4*b*, 1*b*), (4*c*, 1*c*), and (4*d*, 1*d*) are arranged so as to be constantly overlapped with each other at any rotational position.

According to Modification 2, it is possible to suppress pulsation of torque of the rotating magnetic field unit 28.

<Modification 3>

Figure 15:
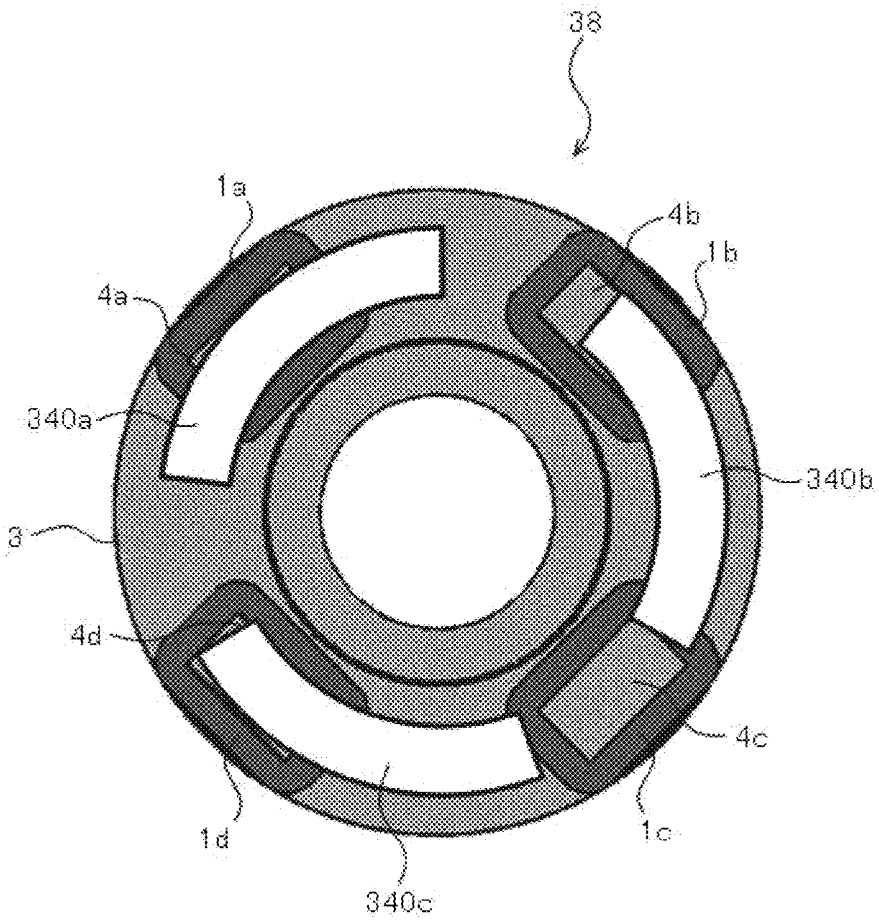
FIG. 15 is a top view of a positional relationship between an AMRR unit and a magnet of a rotating magnetic field unit according to Modification 3.

FIG. 15 illustrates a top view of a positional relationship among AMRR units 340*a*, 340*b*, and 340*c* and the magnets (4*a*, 1*a*), (4*b*, 1*b*), (4*c*, 1*c*), and (4*d*, 1*d*) of a rotating magnetic field unit 38 of Modification 3.

In Modification 3, the magnets (4*a*, 1*a*), (4*b*, 1*b*), (4*c*, 1*c*), and (4*d*, 1*d*) mounted on the magnet disk 3 of the rotating magnetic field unit 38 have four poles, but the number of the AMRR units 340*a*, 340*b*, and 340*c* is three.

A magnetic force applied to the AMRR units 340*a*, 340*b*, and 340*c* is smoothed by making the number of the magnets (4*a*, 1*a*), (4*b*, 1*b*), (4*c*, 1*c*), and (4*d*, 1*d*) of the magnet disk 3 different from the number of the AMRR units 340*a*, 340*b*, and 340*c*. As a result, torque acting on the magnet disk 3 is smoothed to suppress pulsation of the torque.

<<Other Embodiments>>

1. A superconductive electromagnet is exemplified as the magnets (4*a*, 1*a*), (4*b*, 1*b*), (4*c*, 1*c*), and (4*d*, 1*d*) in the above embodiment, but a permanent magnet may be used. When the permanent magnet is used, a cooling mechanism is not required, and manufacturing is simple.

2. The superconductive electromagnets (4*a*, 1*a*), (4*b*, 1*b*), (4*c*, 1*c*), and (4*d*, 1*d*) may be plural as described above or may be singular.

3. The present invention is not limited to the above-described configurations of the embodiment and modifications, and various modified modes and specific modes can be made within the scope of the appended claims.

[Industrial Applicability]

An electromagnet apparatus of the present invention is a magnet apparatus for magnetic refrigeration that utilizes a magnetocaloric effect, and can be used for liquefying liquid hydrogen.

REFERENCE SIGNS LIST

- 1*a*, 1*b*, 1*c*, 1*d* superconducting coil (magnet, superconducting magnet, or magnetic pole)
- 2 disk
- 3 magnet disk (disk)
- 4*a*, 4*b*, 4*c*, 4*d* magnetic pole (magnet, superconducting magnet, or magnetic pole)
- 6 heat transfer shaft (shaft)
- 8 rotating magnetic field generation device (magnetic field generating unit)
- 10 motor (drive mechanism)
- 11 vacuum vessel (adiabatic vacuum vessel)
- 21, 22 heat exchanging device (heat exchanging mechanism)
- 30, 30*a*, 30*b*, 30*c* module coil (superconducting coil)
- 31 superconducting coil
- 40, 40*a*, 40*b*, 40*c*, 40*d* AMRR unit (magnetic cooling mechanism)
- 50, 50*a*, 50*b*, 50*c*, 50*d*, 50*e*, 50*f*, 50*g*, 50*h*, 50*i* heat exchanger (heat exchanging mechanism)

140*a*, 140*b*, 140*c*, 140*d* AMRR unit (magnetic cooling mechanism)

340*a*, 340*b*, 340*c* AMRR unit (magnetic refrigeration mechanism)

E hydrogen liquefaction device (rotating magnetic field generation device and magnetic refrigeration device)

g gap (magnetic field working space)

The invention claimed is:

1. A rotating magnetic field generation device comprising:

a magnetic field generating unit including a plurality of disks, each including a plurality of magnets that are arranged circumferentially on both a top side and a bottom side of each of the plurality of disks, a gap between each of the plurality of disks in an axial direction of the rotating magnetic field generation device forming a magnetic field working space, wherein the plurality of disks are stacked such that the plurality of magnets face each other from one disk to another disk across the gap in the axial direction, and a shaft to which the plurality of disks are fixed, the shaft being installed at a central axis of the plurality of disks;

an adiabatic vacuum vessel in which the magnetic field generating unit is installed; and a drive mechanism that is installed in a room temperature region and rotates the shaft.

2. The rotating magnetic field generation device according to claim 1, wherein the plurality of magnets are a permanent magnet or a superconducting magnet operating in a persistent current mode.

3. The rotating magnetic field generation device according to claim 1, wherein one or more of the plurality of magnets mounted on at least one of the plurality of disk are superconducting magnets and operate in a persistent current mode, and a plurality of the superconducting magnets in the persistent current mode are provided as a whole.

4. A magnetic refrigeration device comprising:

the rotating magnetic field generation device according to claim 1; and a plurality of magnetic cooling mechanisms in which a magnetic working substance having a magnetocaloric effect is arranged in the magnetic field working space.

5. The magnetic refrigeration device according to claim 4, wherein the magnetic cooling mechanism is thermally coupled in the axial direction.

6. The magnetic refrigeration device according to claim 4, wherein the magnetic cooling mechanism is thermally coupled in the axial direction, and a plurality of the magnetic cooling mechanisms are provided.

7. The magnetic refrigeration device according to claim 4, wherein the magnetic cooling mechanism is thermally coupled in the axial direction, a plurality of the magnetic cooling mechanism are provided, and the plurality of magnetic cooling mechanisms are filled with the magnetic working substances having different operating temperatures.

8. The magnetic refrigeration device according to claim 4, wherein the magnetic cooling mechanism is thermally coupled in the axial direction, a plurality of the magnetic cooling mechanisms are provided, the plurality of magnetic cooling mechanisms are filled with the magnetic working substances having different operating temperatures, and the magnetic cooling mechanisms with the different operating temperatures are arranged to make the temperatures different in a circumferential direction with respect to the rotating magnetic field generation device.

9. The magnetic refrigeration device according to claim 4, wherein the magnetic cooling mechanism is thermally coupled in the axial direction, a plurality of the magnetic cooling mechanisms are provided, the plurality of magnetic cooling mechanisms are filled with the magnetic working substances having different operating temperatures, and the magnetic cooling mechanisms with the different operating temperatures are arranged to make the temperatures different in the axial direction with respect to the rotating magnetic field generation device.

10. The magnetic refrigeration device according to claim 4, wherein a number of magnetic poles arranged in the plurality of disks is not an integer multiple of a number of magnetic poles arranged in a circumferential direction of the magnetic cooling mechanism.

11. A hydrogen liquefaction device comprising:

the magnetic refrigeration device according to claim 4; and a heat exchanging mechanism configured to exchange heat with hydrogen gas introduced from an outside.

12. The rotating magnetic field generation device according to claim 1, wherein in the axial direction the plurality of magnets on the top side of the one disk face, across the gap, the plurality of magnets on the bottom side of the another disk, and the plurality of magnets on the top side of the another disk face, across the gap, the plurality of magnets on the bottom side of a third disk.

* * * * *